United States Patent
Yip, Jr.

(10) Patent No.: US 7,038,130 B2
(45) Date of Patent: May 2, 2006

(54) ELECTRICAL FITTING AND SYSTEM FOR INSTALLATION OF ELECTRICAL BOXES IN POURED CONCRETE

(76) Inventor: Gary Sing Choy Yip, Jr., 572-A Kunu Pl., Maui, HI (US) 96732

( * ) Notice: Subject to any disclaimer, the term of this patent is extended or adjusted under 35 U.S.C. 154(b) by 0 days.

(21) Appl. No.: 10/798,572

(22) Filed: Mar. 12, 2004

(65) Prior Publication Data

US 2004/0206536 A1 Oct. 21, 2004

Related U.S. Application Data

(60) Provisional application No. 60/462,686, filed on Apr. 15, 2003.

(51) Int. Cl.
*H01H 13/04* (2006.01)

(52) U.S. Cl. ................. 174/58; 174/53; 174/48; 220/3.4; 220/3.8; 220/3.9; 220/3.2; 220/3.3; 220/3.92; 220/3.94; 220/241; 220/242

(58) Field of Classification Search .............. 174/58, 174/53, 48; 220/3.4, 3.8, 3.9, 3.2, 3.3, 3.92, 220/3.94, 241, 242
See application file for complete search history.

(56) References Cited

U.S. PATENT DOCUMENTS

| 4,247,738 A | | 1/1981 | Bonato |
| 4,331,832 A | * | 5/1982 | Curtis et al. ................ 174/57 |
| 4,742,585 A | * | 5/1988 | Logsdon ....................... 4/661 |
| 4,899,506 A | * | 2/1990 | Chapman et al. ............ 174/48 |
| 5,420,376 A | | 5/1995 | Rajecki et al. |
| 5,466,886 A | * | 11/1995 | Lengyel et al. ............. 174/48 |

* cited by examiner

*Primary Examiner*—Dean A. Reichard
*Assistant Examiner*—Anton Harris
(74) *Attorney, Agent, or Firm*—Venable LLP; Catherine M. Voorhees (57) ABSTRACT

An electrical fitting for installation of electrical systems in poured concrete, includes a relatively flat body of material having an opening for receiving an electrical conduit, a number of equally spaced legs projecting from a side of the body where the legs are adapted to face a form wall opposing another form wall onto which an electrical box is mounted flush, and a tip disposed on a top of each leg. The tip of each leg is adapted to grip the form wall and provides a sturdy and solid base that holds an electrical box and a conduit in position during the pouring of concrete. The length of each spaced leg is sufficient to allow concrete to flow between the body and the form wall.

16 Claims, 8 Drawing Sheets

ELECTRICAL FITTING AND SYSTEM FOR INSTALLATION OF ELECTRICAL BOXES IN POURED CONCRETE

CROSS-REFERENCE TO RELATED APPLICATION

This application claims priority to U.S. Provisional Patent Application No. 60/462,686, filed Apr. 15, 2003, which is hereby incorporated by reference in its entirety.

FIELD OF THE INVENTION

The present invention relates to a system for holding an electrical box flush against a wall of a concrete form during the pouring of concrete walls and floors for residential and commercial building structures, and to the unique fitting or spacer that enables the system to hold the electrical box flush.

BACKGROUND OF THE INVENTION

Known systems of installing electrical boxes in concrete forms result in electrical boxes being buried in concrete after the pouring of concrete into the forms. As a consequence, it has been necessary to support the electrical boxes in their final position by tying them to reinforced bars within the concrete form. Other know types of additional support include positioning pins or stakes, rivets or magnet means for securing a positioning and attachment cover to a wall of a form or mold for casting concrete walls. The requirement of an additional support, whether tying the boxes to reinforced bars within the concrete form or securing the box to a wall of the form or mold, is a time-consuming process that is labor intensive.

Occasionally, the electrical boxes installed using known systems are not even visible to a worker after the concrete has been poured and the forms are removed. When the electrical boxes are buried in the poured concrete, it is necessary to employ yet another step. In cases where the electrical boxes are covered by the concrete, a chipping gun is used to find the boxes which may be buried deep in the concrete. The chipping gun physically breaks the concrete to get to the boxes and then, the electrical boxes are repositioned. This labor intensive process is also time-consuming and costly.

While a supporting board or strip adapted to be flush with the concrete form wall opposite the concrete form wall to which an electrical box is mechanically secured has been disclosed as preventing the box from being overturned during the casting operation, another disadvantage arises with such a supporting board or strip. In particular, the supporting board or strip prevents a sufficient amount of concrete from being poured between the board or strip so that an opening or void is created in the resultant poured concrete wall. Thus, when the concrete form is removed, a recess in the resultant poured concrete wall marks the area where an electrical box is positioned. Accordingly, the resultant concrete wall would not have a finished look and would require additional time-consuming steps to smooth out the wall. If the pouring of concrete causes the board to slip, concrete may slip between the concrete form and the board or strip. However, the poured concrete around the board or strip would not be sufficient to sustain any forces pressed against the wall as the area would be weak resulting in the concrete wall cracking.

SUMMARY OF THE INVENTION

It is the object of the present invention to provide an electrical spacer that easily and quickly positions electrical boxes between walls of a concrete form and holds the electrical boxes flush against a wall of the concrete form during the pouring of concrete. In particular, the electrical spacer and system for installation ensures that a cover plate of the electrical box, which provides a surface for mounting an electrical device, remains flush with the concrete form during the pouring of the concrete. As a result of the electrical spacer according to the invention, the process of installing electrical boxes within residential and commercial building structures will be streamlined so that the amount of time (labor) spent positioning the electrical boxes is shortened, while achieving better results than known systems of installing electrical boxes. That is, the electrical spacer according to the invention is designed so that it will keep the cover plate or face of the electrical box flush with the form so that when the forms are removed only the face of the box is shown. Consequently, the electrical spacer and system of installing electrical boxes according to the invention is more cost effective than known systems of installing electrical boxes.

The solution, according to the invention, resides in the length (height) and pointed tips of the legs of the electrical spacer. Applicant's system of installing electrical boxes within a concrete form includes a conduit, cut to a desired length, adapted to be fastened to a terminal adapter on one side and an electrical spacer on the other. The terminal adapter is fastened to a middle section of an electrical box. A second terminal adapter may be fastened between the conduit and the electrical spacer. The length of the conduit is determined by the thickness of the concrete wall to be formed and is of a length such that the legs of the electrical spacer grip a wall of the concrete form while the front of the electrical box is positioned flush against the opposing wall of the concrete form. That is, the length of all the joined parts of the electrical box installation system will be exactly the same as the wall thickness thereby guaranteeing that the electrical box will be flush with the concrete form and resultant wall. Consequently, the electrical box installation system according to the invention can be used in any wall thickness.

The electrical fitting or spacer and system of installation according to the invention may be used to quickly install electrical boxes in floors of buildings or structures under construction. The constructed floors may be made out of poured concrete with the poured concrete providing additional support for holding the electrical box vertically, or, the electrical fitting or spacer and system of installation according to the invention may be designed so that a terminal adapter securely holds the electrical box in place and a terminal adapter or other method securely holds the fitting or spacer to the other end (sub-floor) of the finished floor.

Similarly, it is envisioned that the electrical fitting or spacer and system of installation according to the invention may be used to install and hold electrical boxes within drywall construction.

The electrical spacer of the invention has a number of equally spaced legs with pointed tips or prongs. The length or height of the equally spaced legs that project from a back of the body of the spacer is designed such that sufficient space is provided between the back of the electrical spacer and the adjacent wall of the form. According to the invention, the space provided between the back of the spacer and form wall allows concrete to easily get in between these parts so that the concrete sets properly. This results in a strong, poured concrete wall being formed about the electrical spacer. In contrast, if the space between the back of the spacer and the form wall does not enable the concrete to easily flow between these parts, a void may be created between the form wall and the spacer resulting in the concrete around the spacer being weak so that the resultant wall could easily crack or chip apart.

The electrical spacer according to the invention is made from a body of material and has a number of equally spaced legs projecting from a side of the body, which is adapted to face a form wall opposing another form wall onto which an electrical box is mounted flush. The number of equally spaced legs projecting from the body of the electrical spacer provides a sturdy and solid base that grips the concrete form and holds the electrical box and conduit in position during the pouring of concrete. In a preferred embodiment, the number of equally spaced legs is four. Each leg projecting from a side of the body has a length and a top spaced from the body of the electrical spacer. On each top of each leg is a frustoconical point. Each frustoconical point is adapted to grip a wall of the form while concrete is poured between the legs and the side of the body. That is, the concrete flows over the legs, without interfering with the grip produced by the equally spaced frustoconical tips.

In addition to creating a strong gripping function while the concrete is being poured, the narrow tips or points at the top of the legs serve to provide a nicer finish to the poured concrete walls. That is, when the forms are removed, only the small tips of the spacer legs are revealed. Thus, the poured concrete wall will be smooth and strong. Further, while it will be easy to see the electrical box disposed at a front of a wall, it will be difficult to see where the electrical fitting or spacers of the electrical system for installation according to the invention are positioned in the rear of the poured concrete wall.

The three basic parts of the system for installing electrical boxes within a concrete form includes an electrical box including a ring or cover plate, a conduit and an electrical spacer or fitting. Since there are few component parts, the electrical box installation system according to the invention can be designed to be small and sleek so that it can be easily installed between the reinforcing bars that will support the poured concrete walls. In addition, the electrical fitting or spacer can be used with every type of electrical box currently on the market. Thus, the system for installation of electrical boxes is universal in that it can be used in any wall thickness and with any type of electrical box on the market.

BRIEF DESCRIPTION OF THE DRAWINGS

The foregoing object of the invention, together with other objects and advantages that may be achieved by its use, will become more apparent upon reading the description of the invention taken in conjunction with the drawings, which illustrate exemplary embodiments of the invention, where like reference numerals identify corresponding components, and wherein.

DETAILED DESCRIPTION OF THE INVENTION

Figure 1:
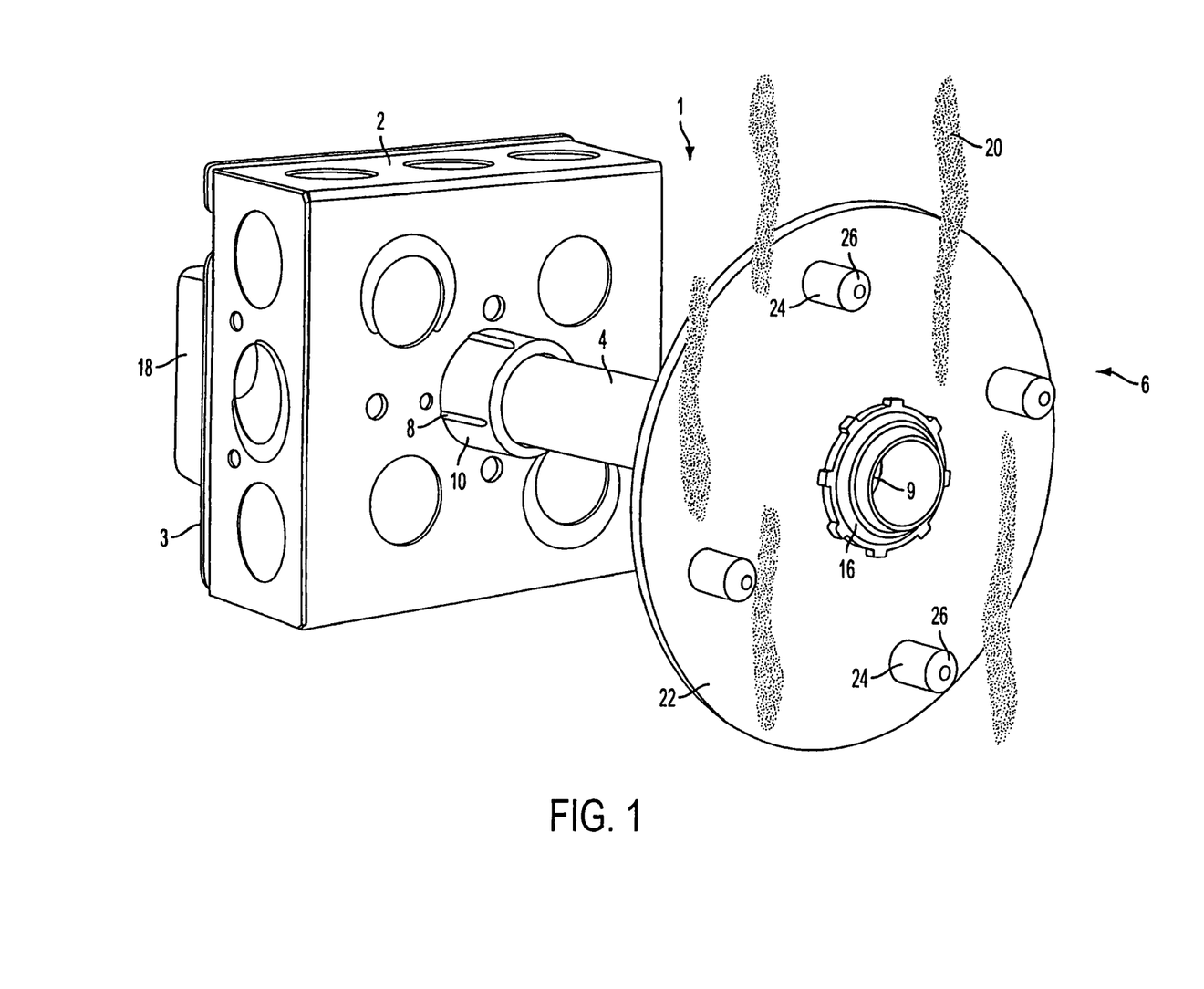
FIG. 1 is a perspective view of a system for installing electrical boxes in poured concrete structures, according to the invention, schematically illustrating the pouring of concrete.
Figure 2:
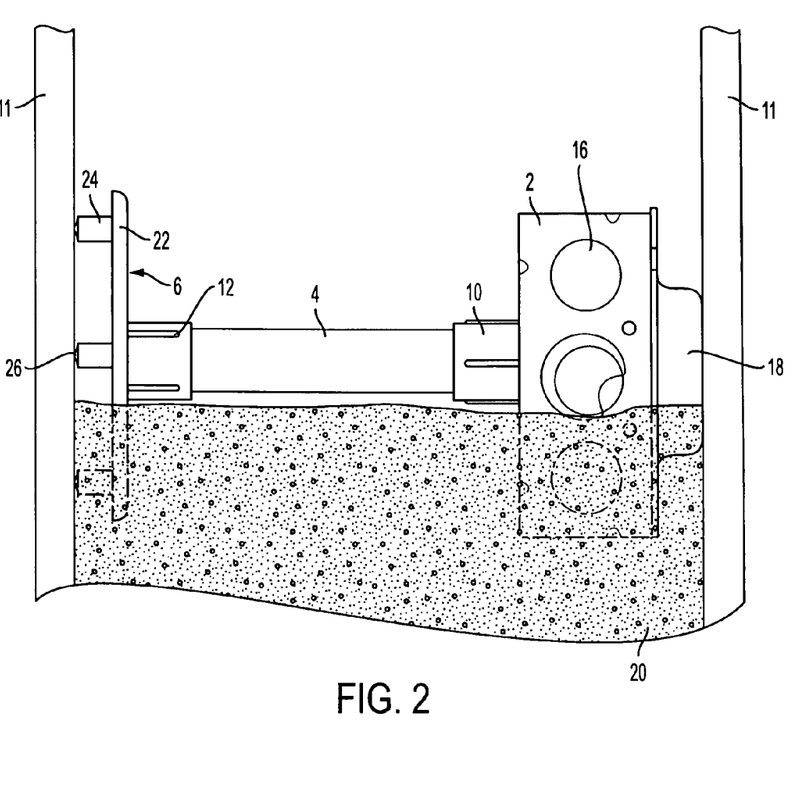
FIG. 2 illustrates the system of FIG. 1 in use, after a portion of concrete has been poured.
Figure 3:
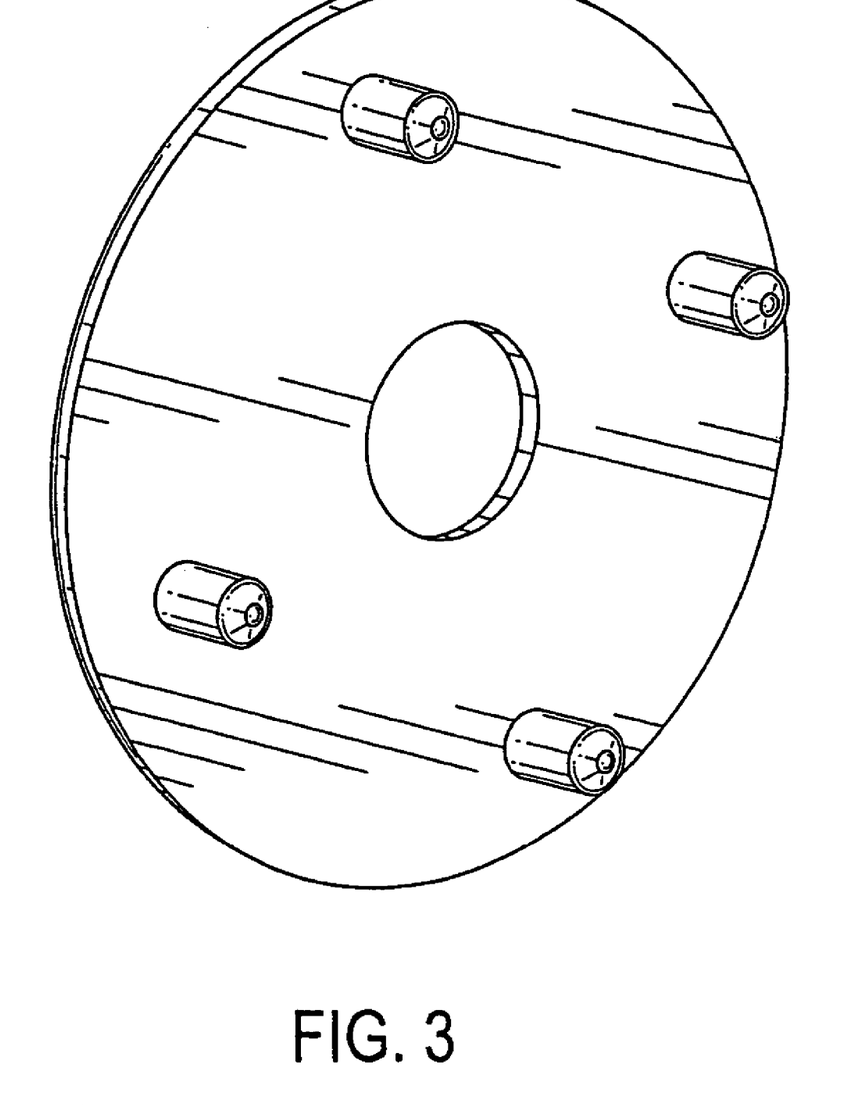
FIG. 3 is a perspective view of an electrical fitting according to the invention.
Figure 4:
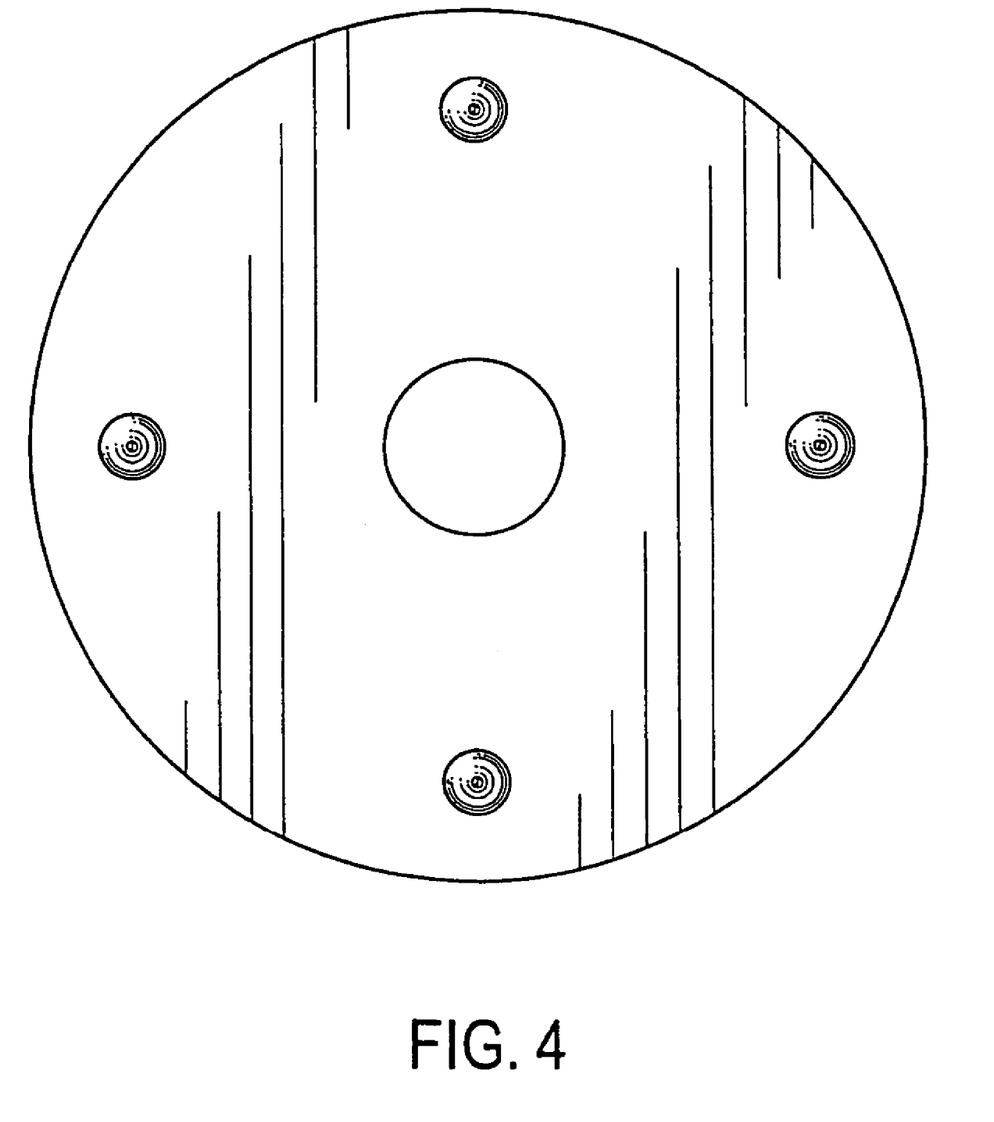
FIG. 4 is a bottom view of the electrical fitting of FIG. 3.
Figure 5:
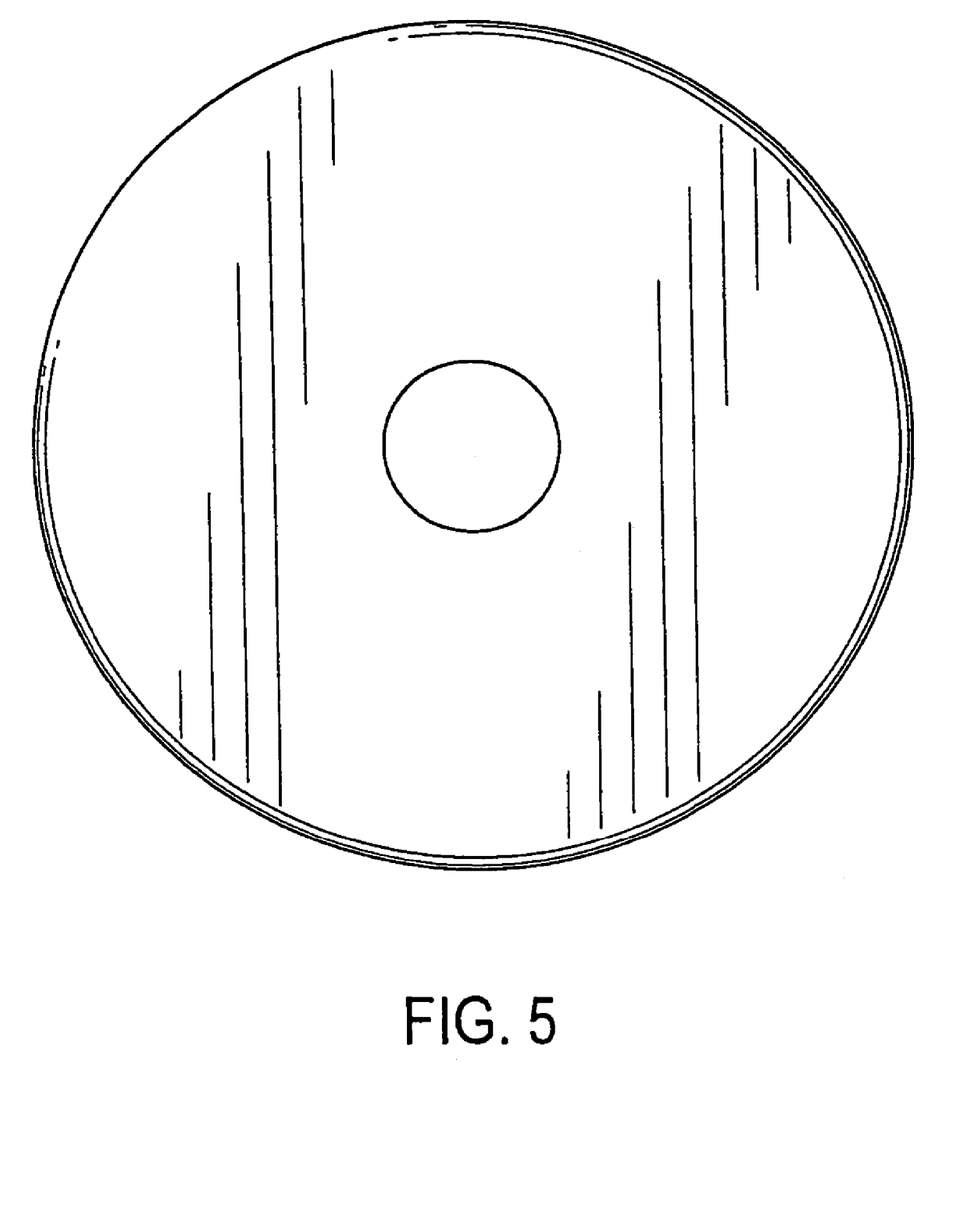
FIG. 5 is a top view of the electrical fitting of FIG. 3.
Figure 6:
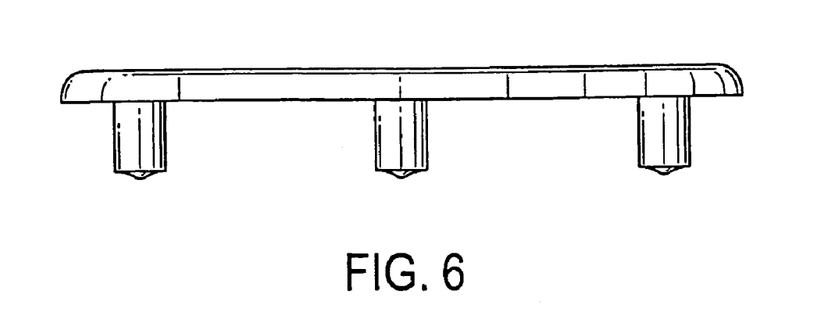
FIGS. 6–9 are side views of the electrical fitting of FIG. 3.
Figure 7:
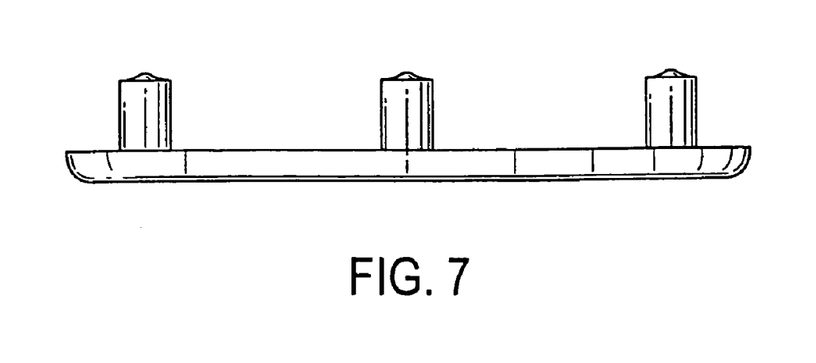
Figure 8:
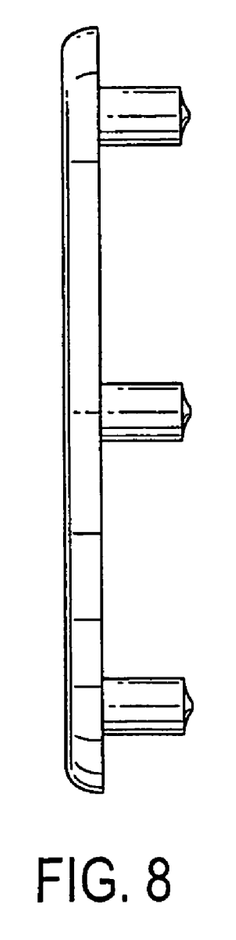
Figure 9:
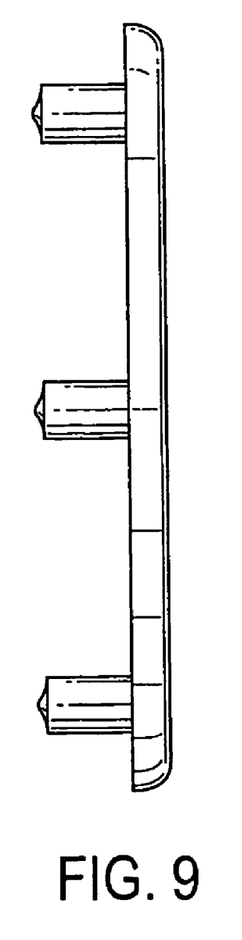
Figure 10:
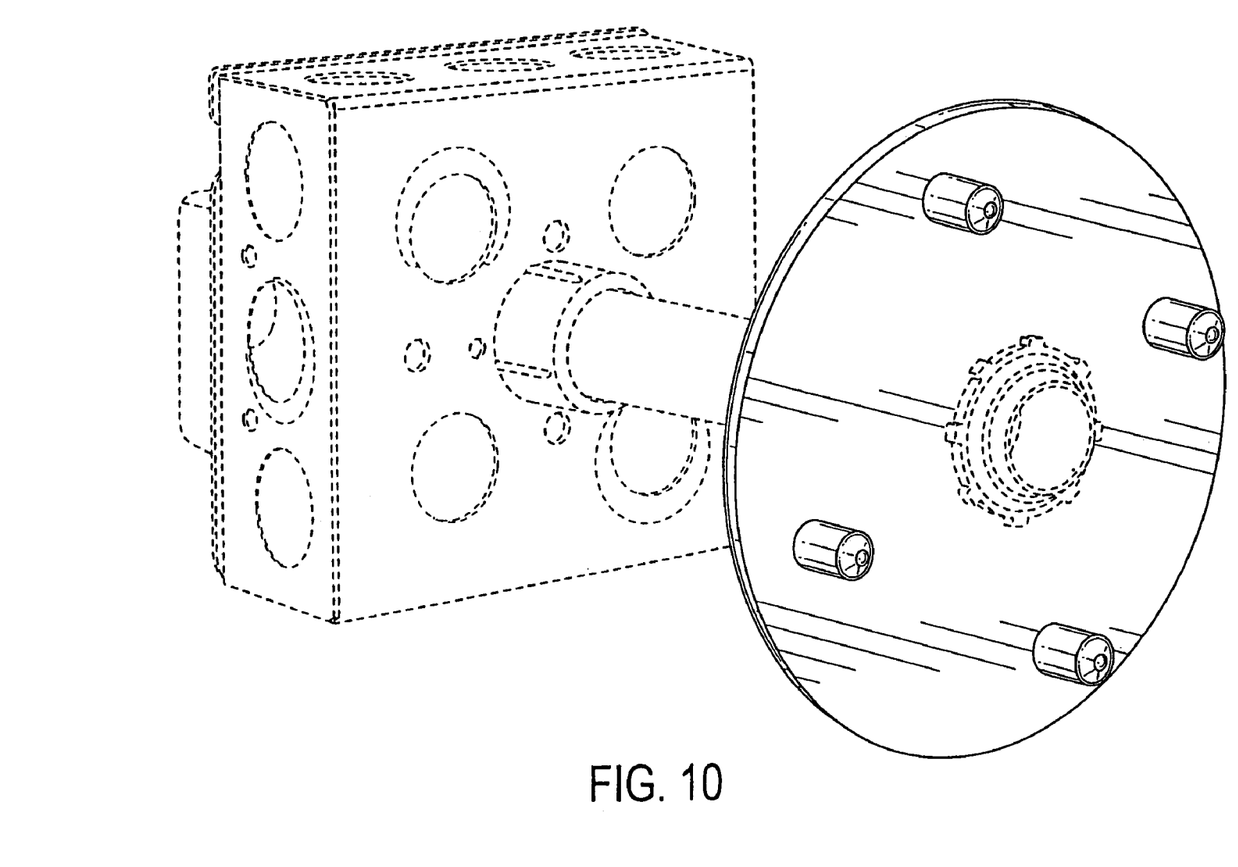
FIG. 10 illustrates the electrical fitting of FIG. 3 attached to a system for installing electrical boxes (shown in dashed lines).

Referring to FIG. 1 of the drawings, system 1 for installing electrical boxes in poured concrete structures includes an electrical box 2 with a cover plate 3 that receives an electrical device after a concrete structure is formed, a conduit 4 attached at one end to the electrical box 2, and an electrical spacer or fitting 6 attached to the other end of the conduit 4. In an exemplary embodiment, conduit 4 is attached to a central region 8 of electrical box 2. The conduit may be made from a plastic material, such as polyvinyl chloride (PVC). The use of PVC or like plastic material is advantageous because it is relatively inexpensive and can be easily molded into the opening or through hole 9 of electrical fitting 6. Conduit 4 can be attached to the central region 8 of the electrical box 2 via a terminal adapter 10. As shown in FIG. 2, one end of conduit 4 is placed in a terminal adapter 10, which may be secured to the central region of the electrical box via a locknut (not shown-inside the electrical box). A second terminal adapter 12 is attached to a through hole 9 in electrical fitting 6 and may be secured thereto with a locknut 14 (FIG. 1). Depending upon the width of concrete walls to be poured, the electrical conduit 4 is cut to a desired length and inserted into terminal adapters 10, 12 so that the combined measurements of the electrical box 2 with cover plate 3, conduit 4, and electrical fitting 6 approximately equal the width between the form walls 11 serving as a mold for the desired concrete wall. As a result of this structure, which is made to span the distance between the spaced concrete forms and the structure of electrical fitting 6, the system for installing electrical boxes according to the invention remain flush with the concrete form walls 11 during the pouring of concrete.

As shown in FIGS. 1 and 2, a number of circular "knockouts" 16 are disposed on the top, bottom, back and sides of electrical box 2. Depending upon the installation of an electrical device, one or more conduits may be attached to one or more of the circular "knockouts" 16 to house wires of the electrical fixture to be placed in the electrical box 2. This is achieved by removing a "knockout" and fastening a terminal adapter to the resultant hole to which a conduit is fastened for receiving the necessary electrical wires for the electrical device that is to be installed. If additional conduits are employed, these would assist in holding the installation system in its place during the pouring of concrete. The electrical box 2 may further be fastened to the steel rebars within the concrete forms with tie wire for additional support, if needed.

The cover plate 3 of the electrical box 2 is used to provide a surface for any electrical device. Depending upon the number and types of electrical devices to be installed in electrical box 2, the type and shape of the cover plate 3 may vary. In the illustrated example, cover plate 3 has a rectangular protrusion 18 that attaches to electrical box 2. As shown in FIG. 2, the face of rectangular protrusion 18 rests against one of the concrete form walls 11 and the poured concrete 20 surrounds rectangular protrusion 18. As a result of the instant invention, the installation system does not move during the pouring of the concrete so that the face of the rectangular protrusion 18 is flush with the formed concrete wall and only the face of the rectangular protrusion 18 or like protrusion of a cover plate 3 is shown. Since the remainder of the cover plate 3 is surrounded by the poured concrete, electrical box 2 and cover plate 3 provide a firm installation area for an electrical device. The rectangular protrusion 18 or like protrusion of a cover plate 3 contain the holes for mounting the electrical devices to the electrical box 2 and the resultant, formed concrete wall.

The electrical spacer or fitting 6, according to the invention, includes a relatively flat body 22 of material having an opening 9 for receiving electrical conduit 4, a number of equally spaced legs 24 projecting from a side of body 22, and a tip 26 disposed on top of each leg 24 wherein tip 26 grips the form wall 11 and provides a sturdy and solid base that holds an electrical box 2 and a conduit 4 in position during the pouring of concrete 20, as shown in FIGS. 1 and 2. The height or length of each leg 24 should provide enough space between the body 22 of the electrical fitting 6 and a form wall 11 so that the aggregate concrete particles can easily flow between these parts resulting in a concrete wall forming behind body 22 of the electrical fitting 6. While the legs are shown as being circular in the exemplary embodiment, they may be triangular or rectangular in cross-section.

The tips 26 of each leg 24 may have a pyramidal base or a frustoconical base (as shown). As the electrical fitting 6 is designed so that poured concrete can easily flow between body 22 and form wall 11, without interfering with the grip produced by tips 26 of evenly spaced legs 24, concrete will fill in behind body 22 so that only the tip 26 gripping form wall 11 is shown after the form wall is removed. Accordingly, in an exemplary embodiment, tips 26 are small in size so that the resultant concrete wall easily can be painted over without noticing the tips 26 of the electrical fitting 6. The body 22, legs 24, and tips 26 may be made of a plastic material, such as PVC. In addition, the electrical fitting 6 may be made of one piece construction. That is, the body 22, legs 24, and tips 26 can be formed in a mold and thus made out of a single material of unitary construction.

While specific embodiments of the invention have been illustrated and described, it is to be understood that these embodiments have been provided by way of example, and the invention is not limited to those embodiments. It will be apparent to one of ordinary skill in the art that any changes and modifications can be made thereto without departing from the spirit and scope of the invention, as set forth in the appended claims.

I claim:

1. An electrical fitting for installation of electrical systems in poured concrete, comprising:
   a relatively flat body of material having a centrally located opening for receiving an electrical conduit, said relatively flat body having a front side adapted to face a form wall onto which an electrical box is mounted flush and a rear side adapted to face a second form wall opposing the form wall;
   a number of equally spaced legs projecting from the rear side of the relatively flat body wherein the relatively flat body is thinner than a length of each leg, the thickness of the relatively flat body being taken in the same direction as the legs project; and
   a tip centrally disposed on a top of each leg, the tip having a smaller diameter than that of each leg wherein, in use, the tip grips the second form wall and provides a sturdy and solid base that holds said electrical box and said conduit in position during the pouring of concrete wherein the length of each equally spaced leg is designed to allow concrete to flow between the rear side of the relatively flat body and the second form wall.

2. The electrical fitting according to claim 1, wherein the tip has a pyramidal base.

3. The electrical fitting according to claim 1, wherein the tip is frustoconical.

4. The electrical fitting according to claim 1, wherein each spaced leg has one of a circular cross-section, a triangular cross-section and a rectangular cross-section.

5. The electrical fitting according to claim 1, wherein the body, legs and tips are made of plastic.

6. The electrical fitting according to claim 5, wherein the plastic is PVC.

7. The electrical fitting according to claim 1, wherein the body, legs and tips are made of one-piece construction.

8. A system for the installation of electrical boxes in poured concrete structures, said system comprising:
   an electrical box with a cover plate, on its front, that receives an electrical device after a concrete structure is formed;
   a conduit having two ends one of which is attached to a back of the electrical box; and
   electrical fitting attached to the other end of the conduit, said electrical fitting comprising:
      a relatively flat body of material having a centrally located opening for receiving an electrical conduit, said relatively flat body having a front side adapted to face a form wall onto which an electrical box is mounted flush and a rear side adapted to face a second form wall opposing the form wall;
      a number of equally spaced legs projecting from the rear side of the relatively flat body wherein the relatively flat body is thinner than a length of each leg, the thickness of the relatively flat body being taken in the same direction as the legs project; and a tip centrally disposed on a top of each leg wherein, in use, the tip grips the second form wall and provides a sturdy and solid base that holds said electrical box and said conduit in position during the pouring of concrete wherein the length of each equally spaced leg is designed to allow concrete to flow between the rear side of the relatively flat body and the second form wall, and wherein the conduit is of a length so that combined measurements of the electrical box including the cover plate, conduit and electrical fitting approximately equals the width between the form walls of the concrete structure.

9. The system according to claim 8, further comprising at least one terminal adapter and locknut combination where the at least one terminal adapter and locknut combination securely attaches at least one of the electrical box and the electrical fitting to the conduit.

10. The system according to claim 8, wherein the conduit is made of plastic.

11. The system according to claim 8, wherein the tip of the electrical fitting has a pyramidal base.

12. The system according to claim 8, wherein the tip of the electrical fitting is frustoconical.

13. The system according to claim 8, wherein each spaced leg of the electrical fitting has one of a circular cross-section, a triangular cross-section and a rectangular cross-section.

14. The electrical fitting according to claim 8, wherein the body, legs and tips of the electrical fitting are made of plastic.

15. The system according to claim 14, wherein the plastic is PVC.

16. The system according to claim 8, wherein the body, legs and tips of the electrical fitting are made of one-piece construction.

* * * * *